Figure 1B:
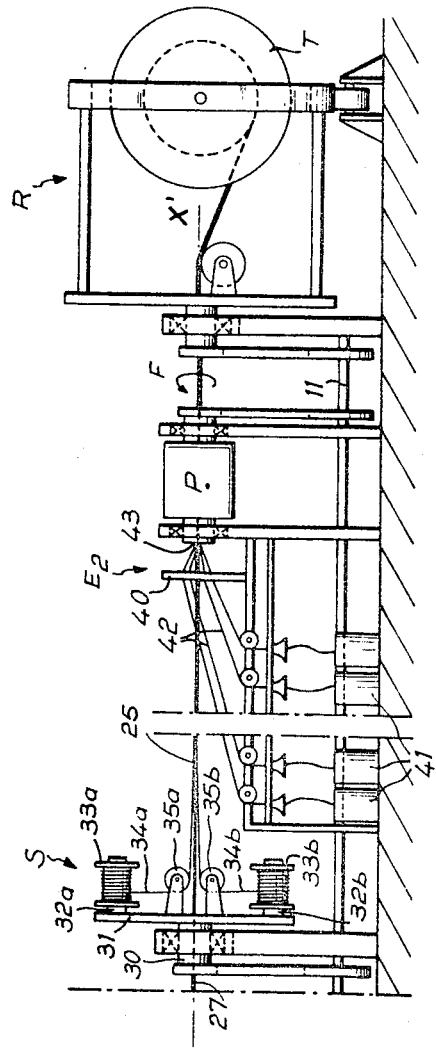

Sept. 13, 1966  O. HAUGWITZ  3,271,941
MACHINES FOR MANUFACTURING MULTI-CORE CABLES
Filed April 7, 1964  2 Sheets-Sheet 1
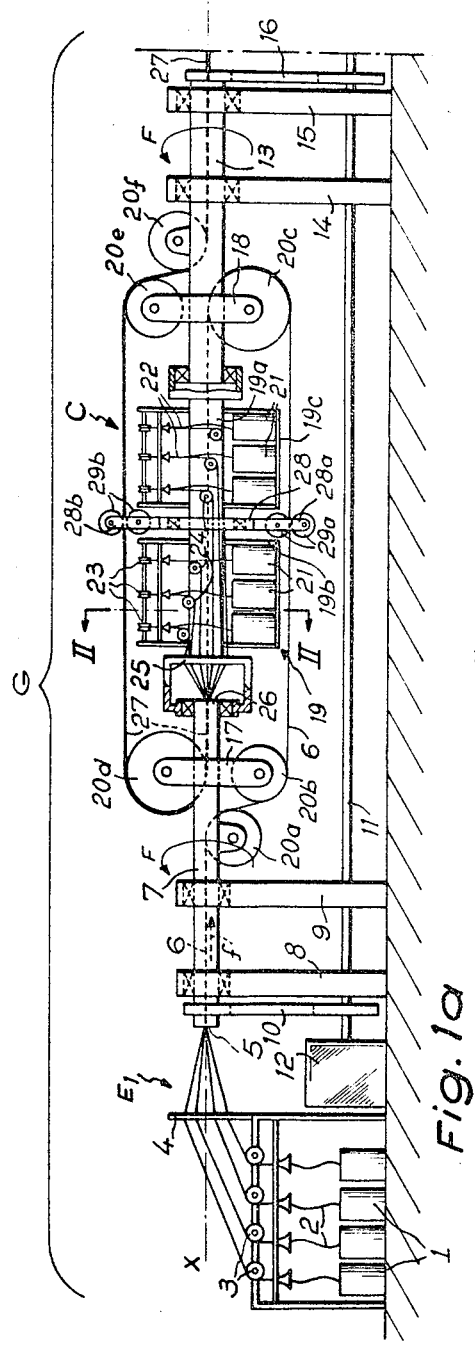
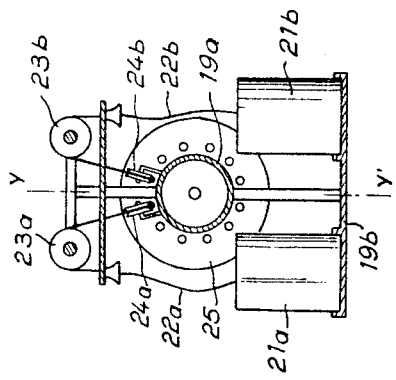

United States Patent Office 3,271,941
Patented Sept. 13, 1966

3,271,941
MACHINES FOR MANUFACTURING
MULTI-CORE CABLES
Otto Haugwitz, La Celle-Saint-Cloud, France, assignor to
Société Anonyme Geoffroy-Delore, Paris, France, a
French company
Filed Apr. 7, 1964, Ser. No. 358,038
Claims priority, application France, Apr. 11, 1963,
931,208
5 Claims. (Cl. 57—15)

The present invention relates to a machine for manufacturing in one single pass a multi-core cable of the cylindrical or sectoral type.

The conventional method of manufacturing cables with a plurality of alternate cores, includes the use of a cabling machine at whose outlet the cables are turned about their own axes and it is necessary to pass the cables through the machine as many times as the desired number of cores. The result is a substantial increase in the manipulations of the drums and of the cabling time and consequently of the cost of multi-core cables.

Machines of the cage type have been produced allowing multi-core cables to be manufactured in a single pass by means of spools carrying the elementary strands. However these machines operate fairly slowly, are cumbersome and expensive. They also do not allow for the use of supply drums.

The present invention allows these disadvantages to be substantially avoided. One object of the invention is machine for the manufacture in one single pass of a cable having multiple cores in alternate directions, by means of fixed supply drums or spools, which cable may be of the cylindrical or sectoral type.

A machine according to the invention is of the general type comprising a preliminary cabling unit composed of a simple twist cabling assembly having a fixed supply frame for elementary strands and of a cabling assembly having a rotating quadrant plate, a number of revolving quadrant cabling assemblies, depending upon the number of layers desired, located below the first unit and a receiver assembly for the finished multi-layer cable, and wherein each of the said revolving quadrant cabling assemblies comprises in combination: two rotatable half stirrups which are coaxial and provided with means for guiding the cable already formed from the axis of rotation, along which the cable moves in a direction which will be referred to as the "direction of travel" up to the same axis in a direction opposite to that of the direction of travel; a support carried by the two half-stirrups and free in rotation in relation thereto, said support being freely traversed by the cable passing in the said opposite direction and carrying the supply of elementary strands, means being provided to guide said strands towards a distribution grid and a die plate for assembling said strands on the said cable; and means carried by the two half-stirrups for guiding the cable thus formed from its outlet from the said die plate to the axis of rotation in the direction of travel below the two half-stirrups, the various guide means carried by the two half-stirrups being provided in order to cause the cables to change direction at tangents compatible with the rigidity of said cables and to cause said cables to remain fixed in rotation about their own axes when passing through said guide means.

The support carried by the two half-stirrups may be constituted by a tube about which at least one coaxial ring rotates freely, said ring being integral with two arms at 180° to one another and located between the two half-stirrups, said two arms being provided with guide means and means for limiting the sag of the cables under the action of centrifugal force.

The means for guiding the elementary strands provided from supply drums carried by the support connected to the two double semi-quadrants, may be constituted, for each strand, by a set of two pulleys carrying the strand which is delivered substantially vertically via a drum in a substantially horizontal plane parallel to the cabling axis to the distribution grid integral with the said support.

The machine may further comprise, between the latter cabling assembly and the receiver assembly, a single twist cabling assembly composed of a fixed frame for the supply of elementary strands, a distribution grid having a central hole for the passage of the cable already formed and a die plate for assembling said strands on the said cable.

Furthermore, the machine may further comprise, between the latter rotatable stirrup cabling assembly and the cabling assembly preceding the receiver assembly, an apparatus serving to form a conductor of the "sectoral" type, said apparatus comprising in combination: a hollow shaft whose axis is the axis of the machine and rotated about its axis at a speed equal to and in the same direction as that of the assembly preceding it; a support integral with the hollow shaft and perpendicular to the axis of the machine carrying the supply spools for the elementary strands; and means for guiding said strands to the cable passing through the hollow shaft, said means being arranged in such a manner that said strands are applied in groups at angles of 180° to each other parallel to the axis of the cable, the cable thus formed receiving a final core or layer in the cabling assembly preceding the receiver assembly and then passing into a member which gives it, in a known manner, its sectoral form.

In order that the invention may be more clearly understood, reference will now be made to the accompanying drawings which show one embodiment thereof by way of example, and in which:

FIGURES 1a and 1b are elevational views of one form of machine according to the invention, the part of the machine shown in FIGURE 1b axially following on the part of the machine shown in FIGURE 1a, i.e. said two parts having the same cabling axis, and FIGURE 2 is a sectional view, to a larger scale, along the line II—II of FIGURE 1a and showing a detail of the distribution of the elementary strands serving to form a supplementary core or layer of the cables, and of the suspension of the drums.

Referring to the drawings, the machine essentially comprises a cabling assembly shown in FIGURE 1a designated by the reference letter G, and a receiver assembly shown in FIGURE 1b, designated by the reference letter R.

The cabling assembly G shown in FIGURE 1a is composed of two connected units, the first fixed supply unit being given the reference letter E1 and the second, rotating quadrant unit, of said assembly being given the reference C.

The cabling assembly G may be followed by one or more units of the type referred to hereinafter by the reference C, according to the number of cores or layers it is desired to have in the finished cable.

Between the last of these units C and the receiver assembly R, has been shown in FIGURE 1b an apparatus referred to in its entirety by the letter S, which serves to form a cable of the sectoral type from the cable issuing from the final cabling unit.

Between this apparatus S and the receiver R has been shown in FIGURE 1b a final cabling unit which in its entirety has been given the reference letter E2 and is similar to the first cabling unit E1 of the assembly G.

Between the cabling unit E2 and the receiving assembly R has been shown in FIGURE 1b in a diagrammatic manner a member P serving to give the cable its sectoral form and to compress it if necessary, for example by rolling.

The various units, assemblies and apparatus hereinbefore mentioned will now be described.

The first unit E1 of a cabling assembly G comprises fixed supply units shown in the drawing in the form of drums 1; these drums supply elements 2 which are guided by means of pulleys 3 to a distribution grid 4; these elements then pass through a die plate 5, the axis of which is the cabling axis X–X' of the machine; the elements 2 as assembled in the draw plate 5 form a cable 6 which passes in the direction of the arrow $f$, which direction will hereinafter be known as "the direction of travel."

The die plate 5 has been shown in the drawing, by way of example, integral with a first rotating hollow shaft 7 of the second unit C of the cabling assembly G; this shaft, whose axis is the axis X–X', is traversed by a cable 6 and is carried by two supports 8 and 9; it is rotated in the direction of the arrow F by means of a belt 10 which connects it to a shaft 11 driven by a motor 12.

The cabling unit C similarly comprises a second hollow shaft 13 whose axis is the axis X–X' and which is carried by two supports 14 and 15; this hollow shaft 13 is rotated in the same direction as the hollow shaft 7 and at the same speed by means of a belt 16 connecting it to the shaft 11.

The two hollow shafts 7 and 13 are respectively integral with the ends of two double half-stirrups 17 and 18 and carry a support assembly which is designated by the reference numeral 19 and which is free in rotation in respect of said half-stirrups.

The two half-stirrups 17 and 18 are provided with guide pulleys, on the one hand pulleys 20a, 20b, 20c conveying cables 6 into the hollow shaft 13 through which it passes, moving in the direction opposite to the direction of travel of the machine and passing about its own axis at the same speed as that of the half-stirrups 17 and 18, and on the other hand pulleys 20d, 20e and 20f, the function of which will be explained hereinafter.

The support 19 has been shown in the form of a tube 19a traversed by the cable 6 and integral with supports 19b and 19c which carry magazines shown in the drawing in the form of drums 21. These drums discharge elements 22 which are guided by means of pulleys 23 and 24 towards a distribution grid 25 integral with the hollow shaft 19a. This grid 25 is traversed at its centre by the cable 6.

The cable 6 and the element 22 then pass through an assembly die plate 26 which is shown in the drawing integral with the hollow shaft 7.

The cable 27 leaving the assembly plate 26 thus comprises a second core or layer assembled on the cable 6 in the opposite direction to that of the first core or layer. The cable 27 passes through the hollow shaft 7 and leaves it guided by the pulley 20d, 20e, 20f which convey it into the hollow shaft 13 in the passing direction of the machine.

Between the pulleys 20a and 20c on the one hand and pulleys 20d and 20e on the other hand, is located a ring 28 mounted to rotate freely about the hollow shaft 19a. This ring carries two arms 28a and 28b arranged at 180° to one another, on each of which is mounted a pair of pulleys designated by the reference numeral 29a on the support 28a, and 29b on the support 28b.

The cable 6 passes between the pulleys of the pair 29a in its passage between the pulleys 20b and 20c; the cable 27 passes between the pulleys of the pair 29b in its passage between pulleys 20d and 20e. These two cables are thus guided in these passages and rotate the ring 28.

It will be noted that the various pulleys, 20a, 20b, 20c on which the cable 6 passes, and 20d, 20e and 20f on which cable 27 passes, are provided in order to cause said cable to change direction at relatively great tangents compatible with the rigidity of said cables. They are similarly provided so that the cables cannot rotate about their axes while passing between said pulleys.

Furthermore the arrangement of the ring 28 and of the pairs of pulleys 29a and 29b has been provided for the following reasons: the speed of cable production using the machine will be all the greater as the synchronous speed of rotation of the two half-stirrups increases. Thus, in order to reduce the effect of centrifugal force on cables 6 and 27 it is important to reduce the distance between said cables; hence in order to accommodate the necessary number of magazines 21 the length of the unit C1 i.e. the distance between the axes of the pulleys 20b and 20c is extended.

It is consequently necessary to ensure that the cables 6 and 27 be initially guided when the machine is switched on, by means of the inner pulleys of pairs 29a and 29b, and on the other hand when the machine is in operation, by means of the external pulleys of the same pairs in order to limit sagging of said cables under the action of centrifugal force.

If the distance between the pulleys 20b and 20c is great, two or more rings, such as ring 28, may be arranged on the tube 19a in order to ensure better guiding.

The tube 19a is stationary and the ring 28 turns about the tube because the arms 28a and 28b are driven by the rotation of cables 6 and 28 about the axis X–X'. In order to reduce the inertia effect when the machine slows down before stopping, it is important to reduce to a minimum the mass of the ring 28 and of its arms 28a and 29a and of the pairs of pulleys 29a and 29b.

It can be seen that the cable 27 rotates about its own axis at its outlet from the cabling unit C, in the same direction and at the same speed as those of the cable 6 at its entry into said unit C. Thus, other units such as C, carrying a greater number of supply drums, may be arranged after the unit D, the number of said additional units being determined by the number of cores or layers of the cable to be produced.

In FIGURE 2 a preferred embodiment of the distribution of the elements paid out by the fixed supply drum of the unit C of an assembly G have been shown.

The drums 21a and 21b are symmetrically arranged in respect of the vertical plane Y–Y' perpendicular to the cabling axis X–X' of the machine. The elementary strands 22a and 22b paid out by said drums pass on to pulleys 23a and 24b are then taken by cone pulleys 24a and 24b surrounding the hollow shaft 19a. These latter pulleys guide the elements towards the distribution grid 25 in a direction substantially parallel to the axis of the hollow shaft 19a. The elements issuing from the drum 21 carried by the support 19c pass through the fixed support around which the ring 28 rotates.

When the cable leaves the last rotary unit of the type just described, it may be directly up taken by a suitable receiver assembly such as that shown in FIGURE 1b with the reference letter R. In a modification the cable may receive a final core or layer in the assembly E2. It may then be used as a support for the manufacture of a sectoral cable by means of the combination of the apparatus S, the cabling unit E2, and the member P. This latter combination will now be described.

The unit S comprises a hollow shaft 30 traversed by the cable 27 and rotated by the shaft 11 at the same speed and in the same direction as the half-stirrups 17 and 18 of the assembly G; this shaft 30 carries a plate or cage 31 carrying on the one hand supports, two of which are shown in the FIGURE with the reference numeral 32a and 32b, carrying spools 33a and 33b.

The elementary strands 34a and 34b paid out from the spools 33a and 33b are guided by pulleys 35a and 35b which form them into two groups at an angle of 180° to each other substantially parallel to the axis of the cable 27.

The elementary strands are thus arranged on said cable without cabling and pass with the cable through the central part of a distribution grid 40 of the unit E2.

This unit, which is similar to the unit E1, comprises supply drums 41 paying out elementary strands 42 which pass through the distribution grid 40. A die plate 43 ensures that the strands 42 are wound about the cable 27 carrying the parallel strands 34a and 34b.

When it leaves the die plate 43 the cable thus formed passes through the member P which ensures in a known manner the sectoral form of said cable, for example by rolling or hammering.

The finished cable leaves the member P rotating about its own axis in the direction of the arrow F and winds around a drum T of the receiver assembly R; this assembly has been shown in the figure by way of example as a known type of rotating receiver assembly, rotated by the shaft 11.

The rotating receiver assembly shown may of course be replaced by any other suitable receiver assembly.

Fixed supply means in the form of drums have been shown in the drawing but fixed supply means in the form of spools could also be used.

It can be clearly seen from the preceding description that the machine according to the invention allows for the manufacture by means of simple twisting and in one single pass from supply drums or spools, a cable having various cores or layers in alternate directions and with an equal twist; it also allows for the manufacture of a multi-core sectoral cable.

I claim:

1. A machine for manufacturing in one single pass a multi-layer cable of equal twist in alternate directions, comprising a first cabling assembly comprising a simple twist cabling unit arranged to take up elementary strands from a fixed supply frame, and a rotatable stirrup cabling unit, a plurality of rotatable stirrup cabling units equal in number to the number of layers desired in the cable located successively beyond said first assembly, and a receiver assembly for the finished multi-layer cable, each of said rotatable stirrup cabling assemblies comprising in combination: two rotating coaxial half-stirrups provided with means for guiding the cable already formed parallel to the axis of rotation along which the cable moves in its direction of travel and further guide means for directing the cable in the opposite direction along the axis of rotation, a support carried by said two half-stirrups and free in rotation with respect thereto, said support being freely traversed by the cable passing in the said opposite direction and carrying a supply of elementary strands, a distribution grid and an assembly guide plate on said support for laying the strands on said cable, means for guiding said strands towards said distribution grid and said assembly guide plate, and means carried by said two half-stirrups for guiding the cable thus formed from its outlet from the said guide plate to the axis of rotation in the direction of travel of said cable beyond said two half-stirrups, said guiding means carried by said two half-stirrups causing the cables to change directions at tangents compatible with the rigidity of said cable and preventing said cables from rotating about their own axes as they pass on said guide means.

2. A machine as set forth in claim 1, wherein said support carried by said two half-stirrups comprises a tube, at least one coaxial ring freely rotatable about said tube, two arms located at 180° to each other integral with said ring and arranged between said two half-stirrups, and means on said two arms for guiding the cables and limiting their sagging under the action of centrifugal force.

3. A machine as set forth in claim 2, wherein said means for guiding the elementary strands paid out from said supply drum carried by said support connected to said two double half-stirrups are constituted, for each strand, by a set of two pulleys conveying the strand fed in a substantially vertical direction from a drum in a plane substantially horizontal and parallel to the cabling axis to said distribution grid integral with said support.

4. A machine as set forth in claim 3, and further comprising between the last cabling unit and the receiver assembly, a single twist cabling unit itself comprising a fixed supply frame for the elementary strands, a distribuiton grid having a central aperture for the passage of the previously formed cable, and a die plate for assembling said strands with said cable.

5. A machine as set forth in claim 4, and further comprising between the last rotatable stirrup cabling unit and the cabling unit preceding said receiver assembly an apparatus serving to constitute a conductor of the "sectoral" type, said apparatus comprising in combination: a hollow shaft co-axial with the machine axis, means for rotating said shaft about its axis at a speed equal to that of the assembly preceding it and in the same direction, a support integral with said hollow shaft and perpendicular to the axis of the machine, carrying spools for supplying said elementary strands, and means for guiding said strands to the cable passing through the hollow shaft, said means being arranged to apply said strands in groups at an angle of 180° to each other and parallel to the axis of the cable, the cable thus formed receiving a final core in said cabling unit preceding the receiver assembly and then passing into a member for imparting its sectoral form to it.

References Cited by the Examiner

UNITED STATES PATENTS

| | | | |
|---|---|---|---|
| 1,609,455 | 12/1926 | Boe | 57—58.63 X |
| 1,900,310 | 3/1933 | Somerville | 57—58.63 |
| 1,934,026 | 11/1933 | Angell et al. | 57—160 X |
| 2,098,922 | 11/1937 | McKnight | 57—15 X |
| 2,331,648 | 10/1943 | Berggren et al. | 57—58.63 X |

FRANK J. COHEN, *Primary Examiner.*

MERVIN STEIN, *Examiner.*

D. E. WATKINS, *Assistant Examiner.*